United States Patent [19]

Ballance

[11] Patent Number: 4,774,792
[45] Date of Patent: Oct. 4, 1988

[54] EXHIBITION DISPLAY APPARATUS

[75] Inventor: Peter Ballance, Ontario, Canada

[73] Assignee: Ballance Design Limited, Downsview, Canada

[21] Appl. No.: 899,739

[22] Filed: Aug. 25, 1986

[51] Int. Cl.$^4$ .............................................. E04B 1/00
[52] U.S. Cl. ........................................ 52/282; 52/285; 52/482; 52/770; 52/239; 403/391; 403/191
[58] Field of Search ............... 52/64, 71, 278, 285, 52/282, 582, 239, 243, 482, 490, 770; 248/316.7, 231.8; 403/191, 386, 389, 391, 399; 211/182, 189; 108/157, 158; 312/140; 160/135, 351

[56] References Cited

U.S. PATENT DOCUMENTS

| | | | |
|---|---|---|---|
| 713,888 | 11/1902 | Kellner | 248/251 |
| 1,268,622 | 6/1918 | Reynolds | 362/396 |
| 1,389,984 | 9/1921 | Reed | 211/74 |
| 1,834,512 | 12/1931 | Asmus | 52/65 |
| 1,987,115 | 1/1935 | Kotrbaty | 52/236.8 |
| 2,307,216 | 1/1943 | Graham | 339/276 R |
| 2,379,179 | 6/1945 | Petersen | 52/285 |
| 3,659,389 | 5/1972 | Forberg | 52/285 |
| 3,675,380 | 7/1972 | Moss | 52/80 |
| 3,763,607 | 10/1973 | Glover | 52/68 |
| 3,871,143 | 3/1975 | Quick | 52/309.1 |
| 3,875,711 | 4/1975 | Palmer | 52/239 |
| 3,930,637 | 1/1976 | Davis | 256/32 |
| 4,213,640 | 7/1980 | Miles | 285/137 R |
| 4,291,512 | 9/1981 | Walton | 52/282 |
| 4,295,754 | 10/1981 | Ashton et al. | 403/369 |
| 4,467,571 | 8/1984 | Logan | 52/63 |
| 4,484,738 | 11/1984 | Ahrens et al. | 272/56.5 |
| 4,594,829 | 6/1986 | Herrgord | 52/285 |
| 4,606,394 | 8/1986 | Bannister | 160/351 |
| 4,637,178 | 1/1987 | Nimmo et al. | 52/36 |

FOREIGN PATENT DOCUMENTS

| | | | |
|---|---|---|---|
| 1933378 | 7/1973 | Fed. Rep. of Germany | 52/285 |
| 2155972 | 10/1985 | United Kingdom | 52/239 |

Primary Examiner—John E. Murtagh
Assistant Examiner—Andrew J. Rudy
Attorney, Agent, or Firm—Donald E. Hewson

[57] ABSTRACT

The disclosed apparatus comprises an outfit of frames of tubular steel, display boards, and securing clips. Some of the clips are frame-to-frame clips, which have symmetrical snap-on C-shaped profiles. Others of the clips are frame-to-board clips, which have one snap-on profile, and one channel shaped profile to grip the board. Still others of the clips are frame to flat surface clips which have one snap on profile, and one flat surface. The resulting modular exhibition display panels are versatile as to their design, and readily adjustable if it should turn out that some changes are needed. The panels are markedly light in weight yet can be strong enough to survive being erected, dismantled, transported, and rebuilt many times.

9 Claims, 4 Drawing Sheets

EXHIBITION DISPLAY APPARATUS

FIELD OF THE INVENTION

This invention relates to display apparatus of the kind that can be pre-prepared before an exhibition, transported to the exhibition, erected at the exhibition, dismantled and removed from the exhibition, and then be stored ready for re-use. Such apparatus can be used repeatedly at many exhibitions, until the display messages it carries become stale, or until the apparatus becomes damaged.

BACKGROUND OF THE INVENTION

It is recognized in the invention that an exhibition display apparatus as described above should be designed with the following criteria in mind.

The problem of the display apparatus becoming damaged is a serious one. Just after an exhibition, conditions are such that all but the most sturdy and robust display stands can become damaged very easily. Each exhibitor is trying at the same time to get his materials dismantled, and get them to a waiting truck.

At such a time, the only reliable way of getting the apparatus onto a truck is to pick up the apparatus and carry it to the truck. Often times, at exhibitions, it is possible to bring the truck right up to the stand; but the exhibitor who can carry—usually by hand—his display materials to the truck can be away from the exhibition hours earlier than an exhibitor who has to wait until his truck can be brought up.

Even the need to use a wheeled trolley or the like is to be avoided if possible, since such trolleys tend not to be available at the critical moments.

The display apparatus therefore should be light enough to be carried; and sometimes it may be quite long distances from an exhibition stand to a waiting truck.

On the other hand, the apparatus must be strong enough to survive being dismantled under hurried and imperfect conditions. The apparatus must also be strong enough to survive the act of being carried to the truck. Moreover the apparatus should be strong enough to survive these things by a wide margin, so that the apparatus can be expected to be used at many exhibitions without being damaged.

The dismantling operation itself should require only a minimum use of tools. The manner of fixing the various parts of the apparatus together should not require the removal of small screws and the like, which might easily be lost in the post exhibition chaos.

Apart from those physical requirements, the apparatus should of course be suitable for its main purpose of carrying display materials. The apparatus should be such that the display designer can try out new display concepts at leisure in his own premises, and be certain that the apparatus will look the same when it is erected at an exhibition.

On the other hand, the apparatus should be versatile so that if changes do in fact turn out to be necessary upon arrival at the exhibition, the changes can be made quickly and simply, and can be made without exposing the apparatus to an increased chance of damage.

GENERAL DESCRIPTION OF THE INVENTION

The invention provides an apparatus which comprises separable panels. The panels are of modular construction, and the invention is aimed at providing a sufficient degree of modularity to permit the panels to be self contained as regards their strength and rigidity.

In the invention, a panel comprises a frame and a board. The frame includes left and right uprights, a top rail, and a bottom rail, all joined together to form an open rectangle. The components of the frame may be tubes, of steel or aluminum or even plastic, which are joined together with spigots.

The boards are dimensioned to fit inside the open rectangle of the frame. The boards carry the display materials.

The boards are attached to the frames by means of frame-to-board clips. These clips have a channel shaped profile, which is sized to squeeze and grip a board placed within the channel shaped profile.

The frame-to-board clips also include a snap-on profile, which is sized to snap sideways or laterally onto the uprights of the frame.

The channel shaped profile and the snap-on profile are arranged back to back on the frame to board clips.

If the frame is made of cylindrical tubing, the snap-on profile has a C-shaped configuration.

The frame preferably is made of cylindrical tubing, in which case the snap-on profile is given a C-shaped configuration. It is arranged that the grip of the snap-on profile to the tubing, when the clip has been snapped onto the tubing, is tight enough that the clip will not slip under normal conditions of use. However, the fit is such that the clip can be forced to rotate around the tubing, and the clip can be forced to move along the tubing. The display designer therefore can move and adjust the clips while setting up the display.

When the display board is assembled into the frame, the board is securely held between the uprights by the channel shaped profiles. It is recognized in the invention that the display board need not itself be self contained as to its structural rigidity, since the frame will enhance the rigidity of the board. Therefore, the display board can be designed to be light in weight.

There is another aspect of the invention which is important from the point of view of permitting the display board to be light in weight. This is that there is no need to attach screws or other fixings into the side edges of the display boards. The channel shaped profile grips the faces of the board between the side walls of the channel shaped profile, thus reducing the need for any kind of screw or other fastener going into the edge of the display board. Therefore the board can be thin.

The display board, in the invention, can be made of, for example, fibreboard, and yet such a display board can have a good service life. On its own and unprotected, fibreboard would quickly start to look shabby, even if it were not immediately broken.

Similarly, the display board can be made of the kind of plastic sheet which, though strong, is brittle and prone to cracking, such as PERSPEX TM. The invention permits the display board to be of such plastics, yet permits the panel to be robust and at the same time permits the plastic to be thin enough for the panel to be light enough to carry.

In the invention, the panels are attached to each other by means of frame to frame clips. These are characterized each by having two of the snap-on profiles arranged back to back on the clip.

Both the frame-to-board clips and the frame-to-frame clips may be manufactured from tough, resilient plastic material by extrusion. The extruded sections may be cut into suitable lengths. In general, the overall strength of grip of the clip is directly proportional to its length.

BRIEF DESCRIPTION OF THE DRAWINGS

An example of an exhibition display apparatus which incorporates the invention will now be described; in association with the accompanying drawings; in which.

DETAILED DESCRIPTION OF A PREFERRED EMBODIMENT OF THE INVENTION

Figure 1:
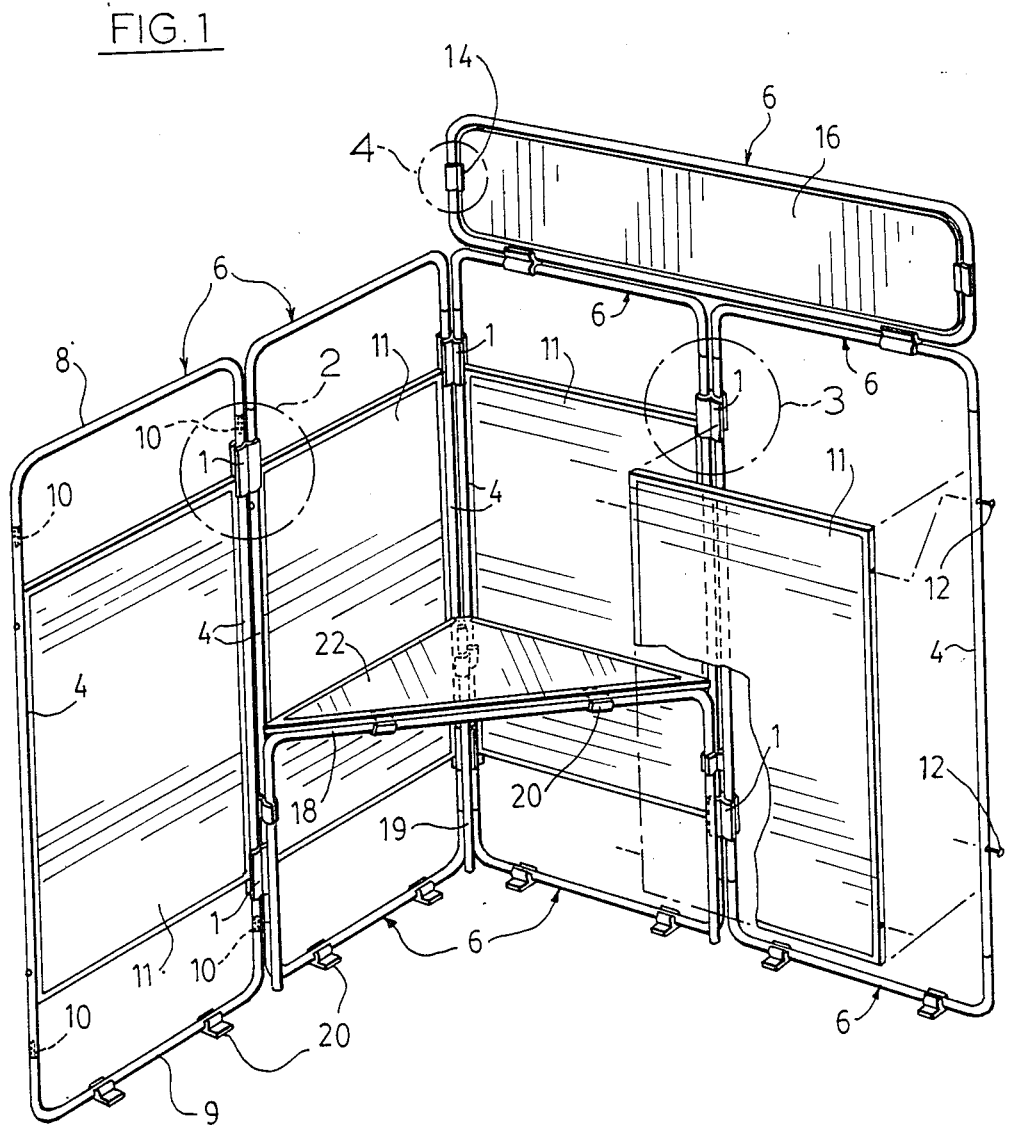
FIG. 1 is a pictorial view of a display stand, which shows how the outfit of apparatus of the invention may be put together.
Figure 2:
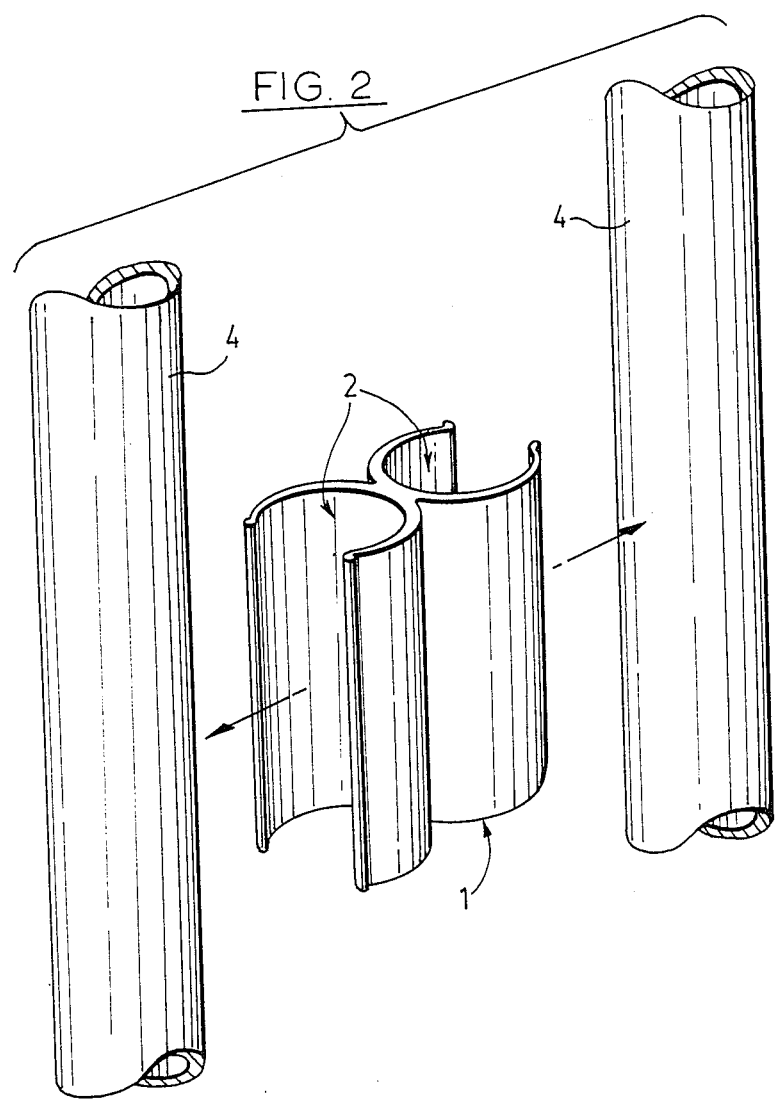
FIGS. 2, 3 and 4 are close up and exploded views of the respective noted portions of FIG. 1.

One of the frame-to-frame clips 1 of the invention is shown in FIG. 2. The clip 1 is made of tough, resilient plastic which is formed by extrusion to the cross sectional shape as shown, then cut to length.

As shown, the frame to frame clip 1 includes two snap-on, C-shaped, profiles 2 arranged in back to back configuration. The snap-on profiles 2 are dimensioned to grip around the steel tubes 4.

The tubes 4 are the respective uprights of two frames 6. The frames also include respective top and bottom rails 8 and 9, which are attached to the uprights 4 by means of plug-in spigots 10.

Figure 3:
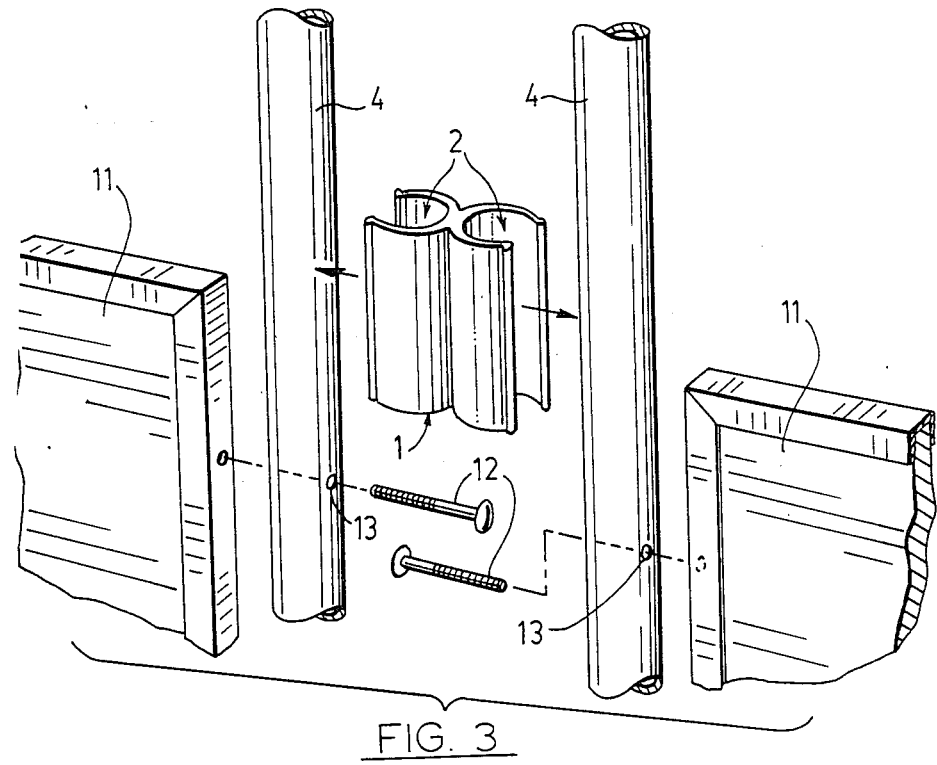

The frames 6 are provided each with a respective display board or boards. As shown in FIG. 3, the display board 11 is attached into the rectangular frame 6 by means of screws 12. The screws 12 pass through pre-drilled holes 13 in the tubes 4. When this method of attachment is used, the board 11 of course must be of such a nature that it can receive screws attached edge on in this manner. The board 11 may be of plywood, for example, of a suitable thickness.

Figure 4:
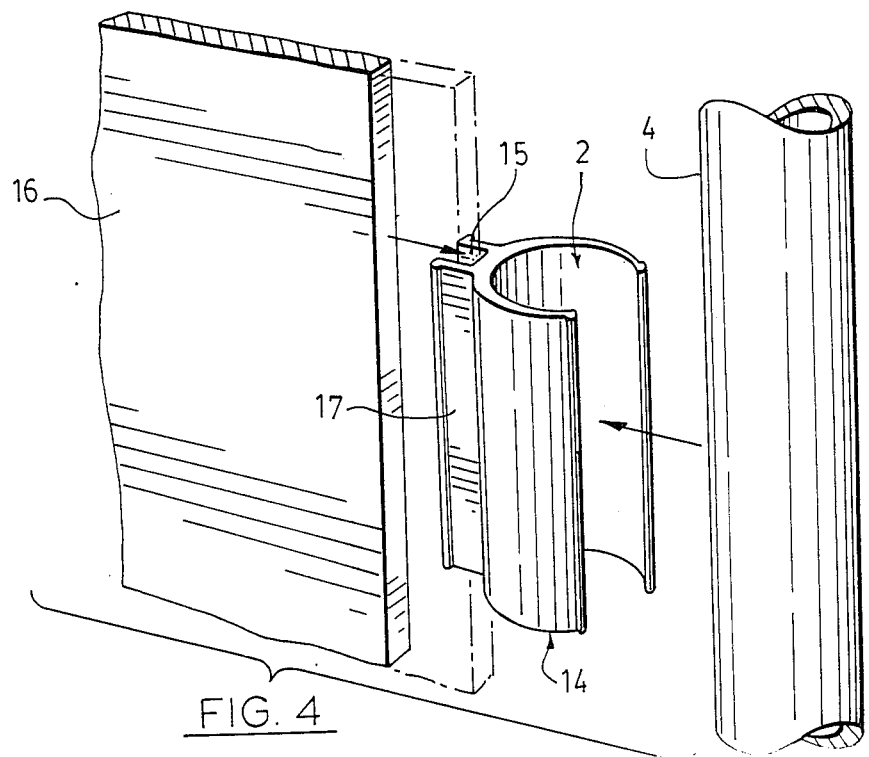

The invention provides frame-to-board clips 14 as shown in FIG. 4, which are for use when it is inappropriate to attach the boards in the FIG. 3 manner. The clips 14 have each a snap-on profile, which is identical to the snap-on profiles 2 of the frame to frame clips 1.

The frame-to-board clips 14 are also provided with a channel shaped profile 15, which is arranged in back to back configuration with the snap-on profile 2.

The display board 16 that is shown in FIG. 4 can be assembled into the frame 6 by assembling the clips 14 to the board 16 and to the uprights 4, before assembling the top rail 8 and bottom rail 9 into the uprights 4.

Figure 7:
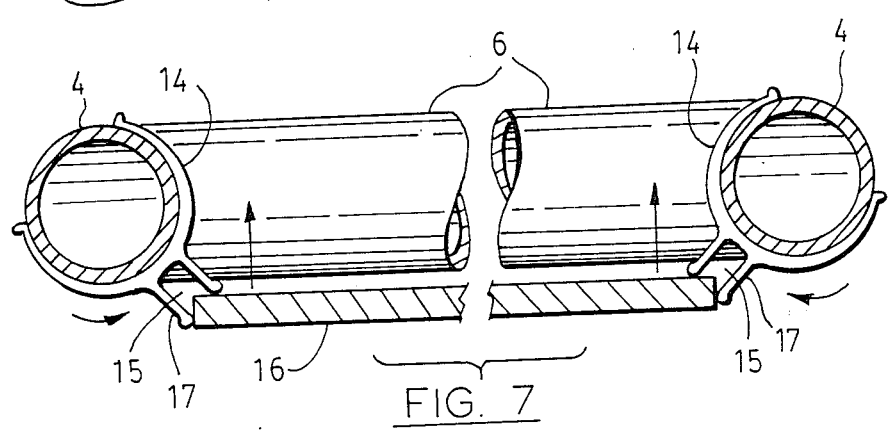
FIG. 7 is a view showing an assembly step of a board into a frame, as may be permitted by this invention.

Alternatively, the board 16 can be assembled into the frame 6 without the frame itself being dismantled. FIG. 7 shows how this may be done. The clips 14 are first oriented as shown; then the board 16 is placed against the clips 14; and then the clips 14 can be manipulated by rotation until the board 16 lies flat between the uprights 4.

It is recognized by the present invention that it is necessary for the sidewalls of the channel shaped profile 15 to have several characteristics. Thus the sidewalls should be resiliently pliable for ease of assembly of the board 16 into the frame 6; yet the sidewalls, when the clip 14 is assembled, should grip the board 16 firmly.

Thus, it may be noted that the channel shaped profile 15 includes sidewalls 17 which protrude quite a substantial distance outwards from the C-shaped profile 2. It has been found that it is comparatively easy to manipulate the board 16 into the frame 6 when the sidewalls 17 are as long as shown, and when the walls 17 are comparatively unbuttressed, also as shown.

In use, the board 16 must be firmly gripped, once in position, both as regards the grip of the clip 14 to the board and as regards the grip of the clip 14 to the upright 4. It is recognized by this invention that the profile 15 as shown promotes the correct compromise between ease of assembly and firmness of grip.

Figure 5:
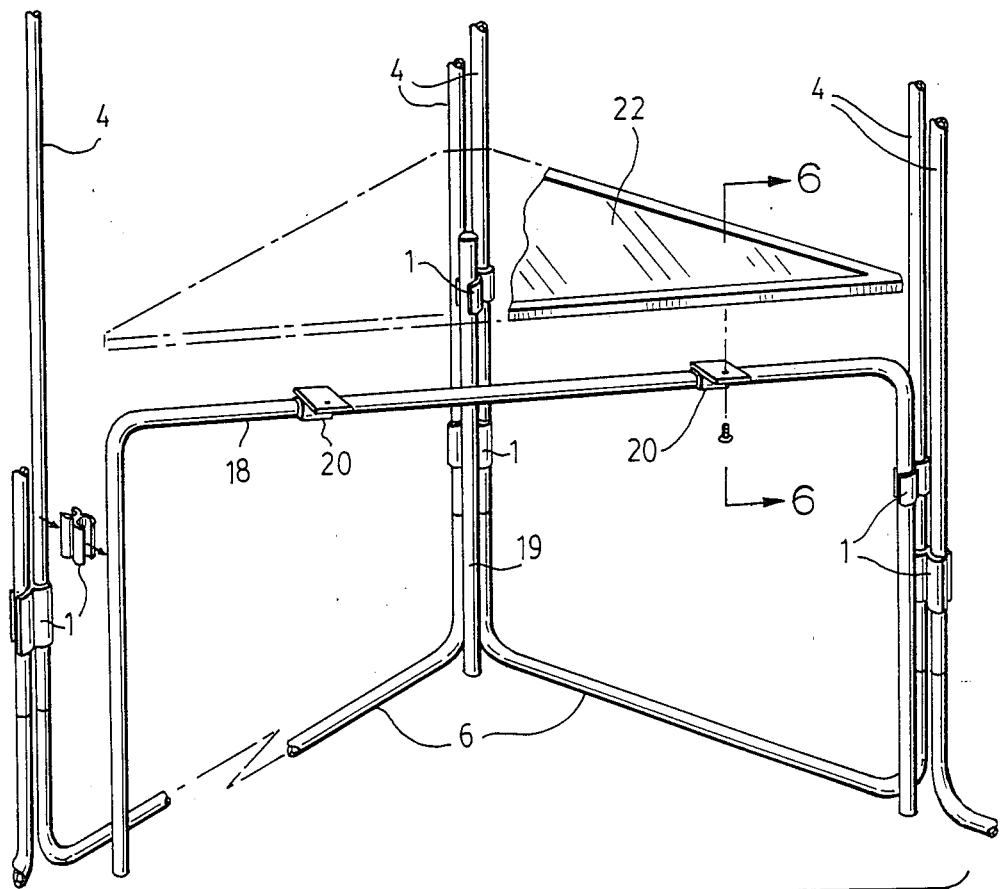
FIG. 5 is an exploded view showing how a table may be incorporated into the display stand using the outfit of apparatus of the invention.

The outfit of apparatus of the invention allows a table to be incorporated into the display stand, such as in the manner shown in FIG. 5. For a simple triangular table, a U-piece 18 of steel tubing is connected between two frames, using frame to frame clips 1. A back piece 19, which is simply a straight length of tubing, is clipped also to one of the frames.

Figure 6:
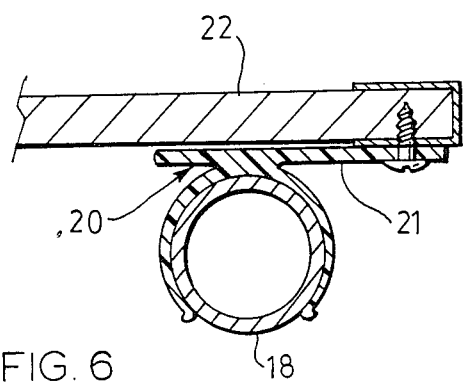
FIG. 6 is a cross section on line 6—6 of FIG. 5.

For increased versatility, the outfit of apparatus of the invention also includes frame to flat surface clips 20, one of which is illustrated in FIG. 6. The frame to flat surface clip 20 includes a snap-on profile, which is identical to the profile 2. The clip 20 also includes a flat surface 21 as part of its extruded cross section. A table top 22 rests on the flat surface 21 and is secured thereto in the manner shown.

Also, frame to flat surface clips 20 can be snapped on to the bottom rails 9 of frames, so as to act as feet for the frames.

The boards 16 may be of thin plywood, for example, for lightness combined with the degree of rigidity required. The boards are not, in the invention, called upon to be rigid in themselves, but need only be rigid enough to provide a good display surface.

Though light, boards 16 mounted in the manner of the invention can carry quite heavy loads. One preferred option that is possible with the invention is to cover the board 16 itself with the loop material component of VELCRO ™ fasteners. The hook material component of that kind of fastener can be secured to objects to be displayed. The result is a very versatile display.

I claim:

1. A modular exhibition display apparatus, characerized by comprising a plurality of frames, fully planar boards, frame-to-frame clips, and frame-to-board clips;

where each frame comprises left and right uprights, a top rail, and a bottom rail, respective ones of said uprights and said rails being joined together to form an open rectangle;

where each frame is in itself sturdy and capable of maintaining the said rectangular shape substantially without support;

where the boards are sized to fit within said frames, with at least one board inside a respective one of the frames;

where the boards are adapted to carry display materials;

where the clips, each having a length many times less than the length of said uprights and said rails, are provided each with a snap-on profile, which is so dimensioned that the snap-on profile may be assembled laterally onto one of said uprights, and when assembled onto said upright grips the upright tightly, and where the profile may be removed laterally from said upright;

where the frame-to-frame clips are formed each with a respective pair of said snap-on profiles arranged in back to back relationship on said frame-to-frame clip;

where the frame-to-board clips are formed each with a respective one of said snap-on profiles which is arranged in back to back relationship on the frame-to-board clip with a respective channel shaped profile; and where the channel shaped profile is so dimensioned as to accept the lateral insertion of a said board therein, to grip the thickness of one of said boards when the board is placed in the channel shaped profile.

2. The apparatus of claim 1, where the clips are formed of extruded plastic, and said profiles are the extruded profiles of that plastic.

3. The apparatus of claim 2, where the plastic material is tough and resilient.

4. The apparatus of claim 1, where the uprights and rails are of tubular material, and are joined together by spigots.

5. The apparatus of claim 1, where at least some of the boards are relatively thin.

6. The apparatus of claim 5, where the thin boards are rigid and sturdy enough to support the display materials, but are not sturdy enough in themselves to structurally support themselves when separated from the respective frames.

7. The apparatus of claim 1, where the snap-on profile is substantially C-shaped, having an internal diameter generally equal to the diameter of the uprights.

8. The apparatus as set forth in claim 7, said C-shaped snap-on profile of said frame-to-frame clips permitting adjacent ones of said frames to be secured one to the other at a selected mutually inclined angle, in stable secured relation.

9. The apparatus of claim 1, where the outfit also includes frame to flat surface clips, formed each with a respective one of the said snap-on profiles, which is arranged in back to back relationship on the frame to flat surface clip with a flat face.

* * * * *